United States Patent [19]

Kambara

[11] Patent Number: 5,160,238
[45] Date of Patent: Nov. 3, 1992

[54] SHAFT TRAVEL DEVICES SUCH AS VERTICAL LIFT ARM DEVICES

[75] Inventor: Goro Kambara, Valley Center, Calif.
[73] Assignee: Hermco, San Marcos, Calif.
[21] Appl. No.: 554,781
[22] Filed: Jul. 18, 1990
[51] Int. Cl.⁵ ............................................. B65G 7/00
[52] U.S. Cl. .................................... 414/663; 414/665; 414/672; 414/744.3; 414/749; 414/785; 187/17; 92/DIG. 1; 92/118; 384/226; 384/556; 248/913; 248/469; 254/93 R
[58] Field of Search ............... 187/17; 414/618, 619, 414/672, 662, 663, 665, 744.3, 744.4, 749, 744.5, 744.6, 787, 785; 92/117 A, 118, 161, 165 R, DIG. 1, 66; 384/226, 556; 74/18, 18.2; 248/469, 913; 254/93 R

[56] References Cited

U.S. PATENT DOCUMENTS

| | | | |
|---|---|---|---|
| 2,576,660 | 11/1951 | Williams | 44/618 X |
| 2,887,092 | 5/1959 | Brady | 92/DIG. 1 |
| 3,311,030 | 3/1967 | Halstead | 92/118 |
| 4,978,274 | 12/1990 | deGroot | 414/744.3 |

FOREIGN PATENT DOCUMENTS

| | | |
|---|---|---|
| 2455284 | 5/1976 | Fed. Rep. of Germany ... 414/744.6 |
| 2754617 | 6/1979 | Fed. Rep. of Germany ...... 414/618 |
| 51648 | 4/1977 | Japan ..................................... 187/17 |
| 1407788 | 7/1988 | U.S.S.R. ............................ 414/744.3 |

Primary Examiner—Frank E. Werner
Attorney, Agent, or Firm—Brown, Martin, Haller & McClain

[57] ABSTRACT

A shift travel device, exemplified by a vertical lift arm device, is described which provides for free rotation of its cylinder and arm about its shaft and free travel along the shaft without transfer of twist imposed by the arm and load to its shaft, constant sealing of operating air pressure within the cylinder during operation and load changes, and minimum friction during rotation when the cylinder and arm are in the extreme raised or lowered positions. The device includes unique self-aligning spherical bearings at the ends of the cylinder. The device is useful is a wide variety of environments, including those which are unusually dirty or clean.

44 Claims, 4 Drawing Sheets

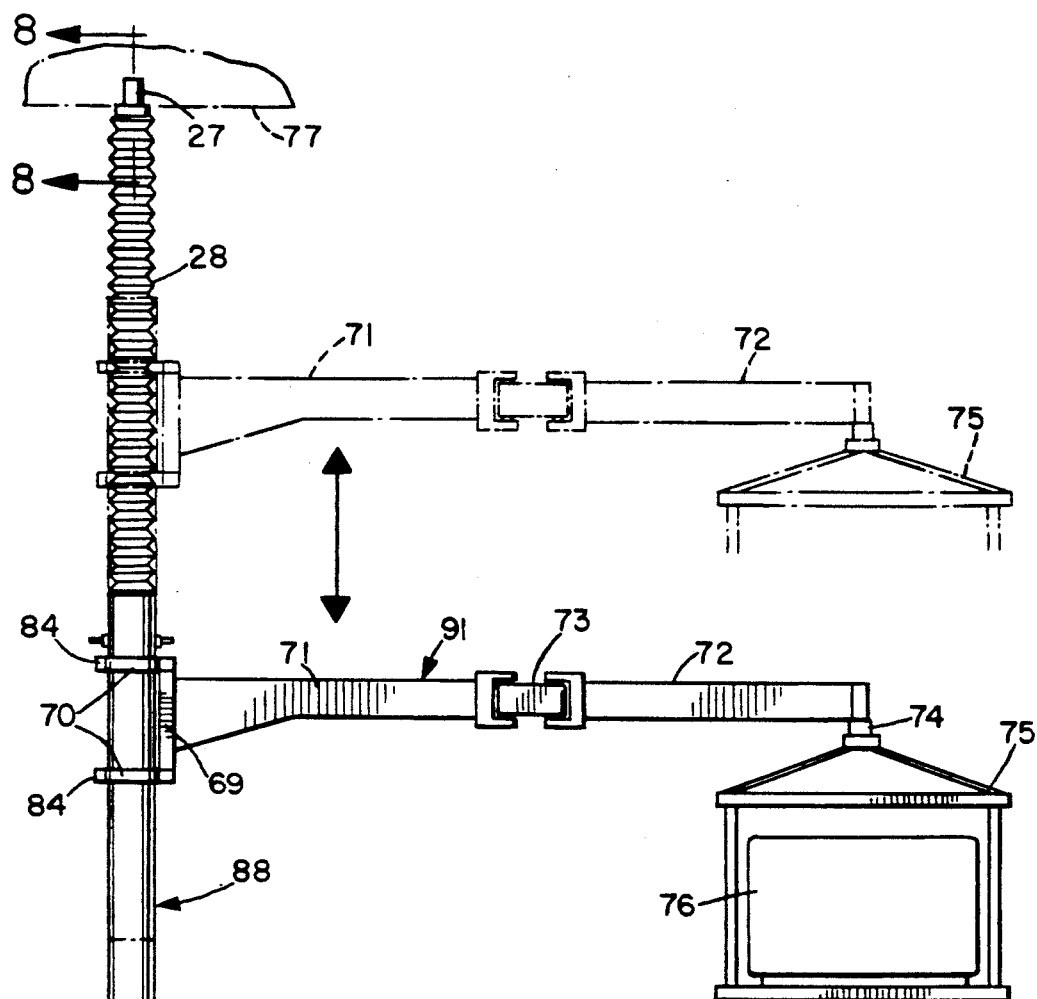
FIG. 1
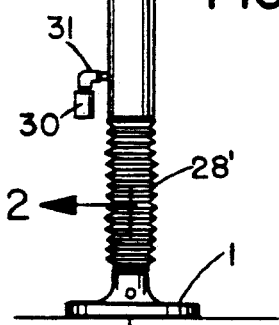
FIG. 2
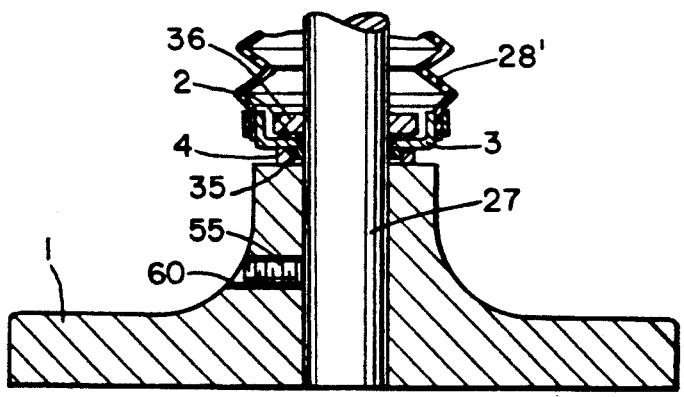
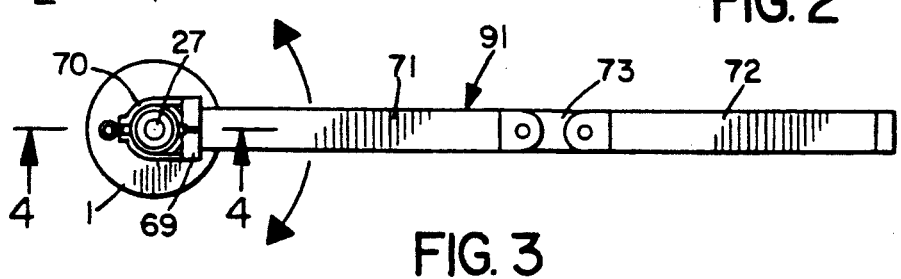
FIG. 3

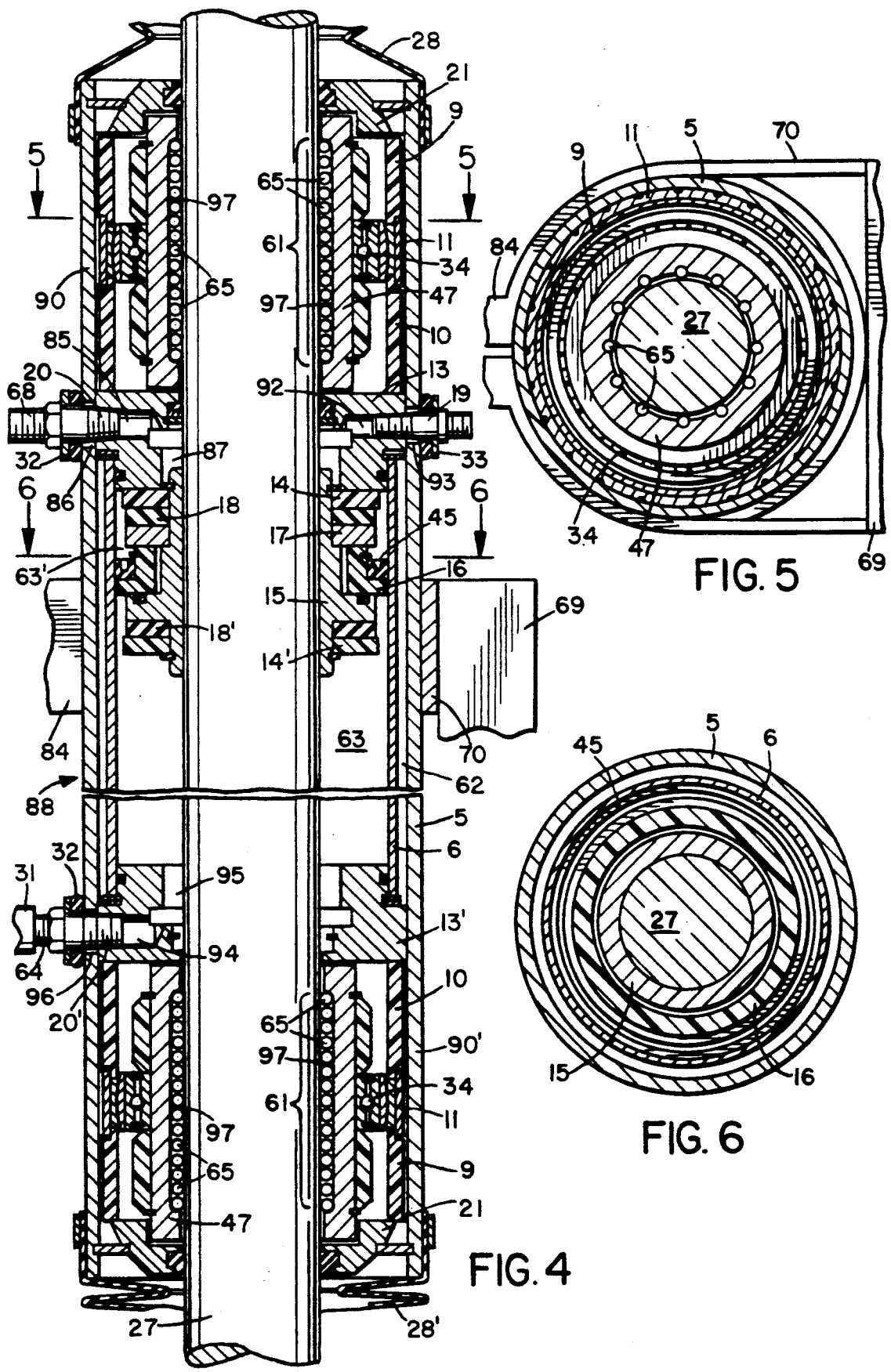

SHAFT TRAVEL DEVICES SUCH AS VERTICAL LIFT ARM DEVICES

BACKGROUND OF THE INVENTION

1. Field of the Invention

The invention here relates to shaft travel devices, such as vertical lift arm devices. More particularly it relates to such devices which are pneumatically actuated.

2. Description of Related Art

Shaft travel devices have been used in industry for a number of years. Such devices are intended to allow workers to safely and easily move heavy or bulky objects. Normally such devices are made up of a cylindrical shaft on which is mounted or into which is incorporated a movable cylinder which traverses along the shaft by pneumatic means. Extending radially outwardly from the cylinder is a elongated arm, which may be jointed, and which terminates in some form of gripping device. The cylinder and arm are normally free to rotate around the shaft for all or some portion of a 360° circle.

One of the most common embodiments of the shaft travel devices is the vertical lift art device, and it is this type of device which will be exemplified herein. In the vertical lift arm device the shaft is vertical and the cylinder lifts or lowers the arm and the object carried by the arm. Objects which a worker could not lift or carry (at least not safely or easily) can thus be handled readily, regardless of the worker's size or strength.

The normal operating range of the device is the circle or portion thereof defined by the length of the extended arm and the degree of permitted rotation around the shaft. (Of course, those devices where the shaft is mounted on a track or movable base permits the range to be extended.) In operation the worker rotates the arm around to the location of a object to be picked up and then activates the power system to raise the cylinder and arm to a position above the object. The arm is then lowered so that the gripping device on the end of the arm can be secured to the object. The arm and object are then raised by the power driven unit and the arm rotated through the desired arc to move the object to the location at which it is to be deposited. Upon reaching that position the arm is lowered to place the object in the desired position. The gripping device is then released, the arm raised and swung back to pick up another object or to be rotated to a "parked" position. Typical applications of these devices includes moving objects from one conveyer belt to another, moving objects from an incoming conveyer belt and stacking them on pallets or vice versa, moving objects from a conveyer belt to an inspection station and then returning them to the conveyor belt after inspection, and so forth.

The usefulness of these devices is based on the recognition that many types of objects are more easily and safely borne and less susceptible to damage if their weight is handled by the mechanical device, so that all the worker has to do is push the arm carrying the object around in its circle. Pushing the arm requires relatively little strength and places very little strain on the worker, as compared to the worker having to lift the object and carry it. The worker is also benefitted in that he or she can work steadily and easily for extended times without risk of injury or fatigue.

Several problems have arisen with such devices, however. It will be recognized that because of the extension of the arm from the cylinder surrounding the shaft and the concentration of the weight of the object at the end of the arm, a substantial amount of vertical torque is exerted against the cylinder. This causes the cylinder to be twisted so that it is distorted away from coaxial alignment with the shaft. In a pneumatically driven unit, it is air pressure retained within a chamber between the shaft and the cylinder which serves to move the cylinder along the shaft and to hold it in a fixed vertical position while the worker rotates the arm to move the object. That air pressure is retained within the chamber by various sealing devices at the top and bottom of the cylinder. The distortion of the cylinder away from a coaxial alignment with the rod causes these seals to also be distorted, such that on the side where the deflecting cylinder is displaced toward the rod the seal is compressed and on the opposite side where the cylinder is displaced away from the rod, the ability of the seal to retain the internal air pressure is diminished. The reduced ability of the seals to maintain the air pressure reduces the degree of control that the worker has during operation of the equipment and, should the seals fail abruptly, substantial damage to the object and the lifting arm device (and perhaps injury to the worker) can be expected.

In addition to the problem of maintaining adequate seals for the operating air pressure, there is often a problem with rotating the arm and cylinder around the shaft. The deflection and distortion of the cylinder discussed above also tends to put unequal loads on the bearings at the upper and lower ends of the cylinder, thus causing the bearings to be compressed against the shaft at one point and to be pulled away from the shaft on the opposite side. Further, when the device is in its fully elevated or lowered position, an upper or lower internal surface of one of the cylinder's heads commonly rests against the internal piston which is secured to the shaft. If the operator tries to rotate the arm while the unit is in the fully extended or lowered position, there is substantial sliding friction between the inner surface of the cylinder head and the piston surface. This makes the rotation of the arm difficult for the worker and may result in jerky motion which can endanger the object being carried or damage the device itself.

Yet another problem is the proper operation and maintenance of lift arm devices in either unusually dirty or clean environments. In a dirty environment, such as when sacks of dusty materials are being handled, the dirt and dust often work into the cylinder and other moving parts of the apparatus and cause binding, scoring of the shaft or bearings and general deterioration of the equipment. Conversely, if the apparatus is to be used in a very clean environment, such as an aerospace clean room, materials such as lubricating oil must not be emitted from the apparatus into the environment.

It is the object of this invention to provide a vertical lift arm device which is substantially free of the problems regarding retention of operating air pressure and interference with smooth and easy rotation of the device's arm, and which can be readily used in a wide variety of environments, including those which are unusually dirty or clean.

SUMMARY OF THE INVENTION

The invention herein is, in one aspect, a pneumatic cylinder for support of a radially extending load and movement of the load around and along a cylindrical shaft, which cylinder comprises: a hollow extended tube having a first end and a second end and a head at each of the ends, each of the heads having a centrally located aperture therethrough for passage of the shaft; sealing means at each end of the tube to form a gas tight annular chamber within the tube and surrounding the shaft; arm support means extending along and connected to the outer side of the tube and being longer than the tube; the support means having first and second end portions connected to the respective heads of the tube and extending axially therebeyond; self-aligning bearing means mounted within the first and second end portions of the arm support means and positioned to be in rotationally and axially movable bearing contact with the shaft; and load transfer means between the end portions of the arm support and the self-aligning bearing means for transferring load applied to the arm through the bearing means to the shaft without causing the bearing means to twist from a co-axial alignment with the shaft and to prevent transfer of distorting force to said tube.

In another aspect, the invention comprises apparatus for moving a load around and along a shaft utilizing that cylinder and comprising: a central cylindrical shaft; a piston fixed to the shaft at a position intermediate from the ends of thereof; a cylinder surrounding the piston and a portion of the shaft, comprising a hollow extended tube having a first end and a second end and a head at each of the ends, each of the heads having a centrally located aperture therethrough for passage of the shaft, first sealing means at each end of the tube to form a gas tight annular chamber within the tube and surrounding the shaft, arm support means extending along and connected to the outer side of the tube and being longer than the tube; the support means having first and second end portions connected to the respective heads of the tube and extending axially therebeyond, self-aligning bearing means mounted within the first and second end portions of the arm support means and positioned to be in rotationally and axially movable bearing contact with the shaft, and non-twisting load transfer means between the end portions of the arm support and the self-aligning bearing means for transferring load applied to the arm through the bearing means to the shaft; a gas conduit formed through one head of the inner cylinder for flow of gas under greater than ambient pressure to and from the annular chamber; second sealing means mounted circumferentially around the piston and dividing the annular chamber into two axially disposed portions and preventing gas under pressure in one of the portions from passing below to the other portion; means for venting gas from the chamber; and a load carrying arm connected to the arm support means; such that the load resulting from the mass of an object suspended from the arm is transmitted to the shaft without causing the bearing means to twist from a co-axial alignment with the shaft.

A further aspect of the invention is the unique self-aligning bearing adapted to be mounted within a housing surrounding a cylindrical shaft and to allow housing to be rotationally around and axially along the shaft, the bearing comprising: an annular bearing block the inner surface of which is adapted to contact the shaft; ring bearing means on the outer side of the bearing block, the outer surface of the ring bearing means forming a convex spherical segment; and bearing race means co-operating with the outer surface of the ring bearing means and having its inner surface forming a corresponding concave spherical segment; such that a load applied to the bearing race means from the housing will be transferred to the shaft without causing the bearing means to twist from a co-axial alignment with the shaft.

BRIEF DESCRIPTION OF THE DRAWINGS

FIG. 1 is a side elevation view of one embodiment of the device of the present invention, showing in phantom representative movement of the device.

FIG. 2 is an enlarged sectional view taken on Line 2—2 of FIG. 1.

FIG. 3 Is a top plan view of the apparatus of the present invention.

FIG. 4 is an enlarged sectional view taken on Line 4—4 of FIG. 3.

FIG. 5 is a sectional view taken on Line 5—5 of FIG. 4.

FIG. 6 is a sectional view taken on Line 6—6 of FIG. 4.

DETAILED DESCRIPTION AND PREFERRED EMBODIMENTS

The operation and advantages of the present invention will be best understood by reference to the drawings, in which the invention is exemplified in the preferred embodiment of a vertical lift arm apparatus. It will be recognized, however, that, although not expressly shown herein, the invention includes equivalent structures in which the apparatus operates in a horizontal or inclined orientation, with the requisite modifications in mountings, arm joints and the like, all of which will be well understood by those skilled in the art.

Figure 7:
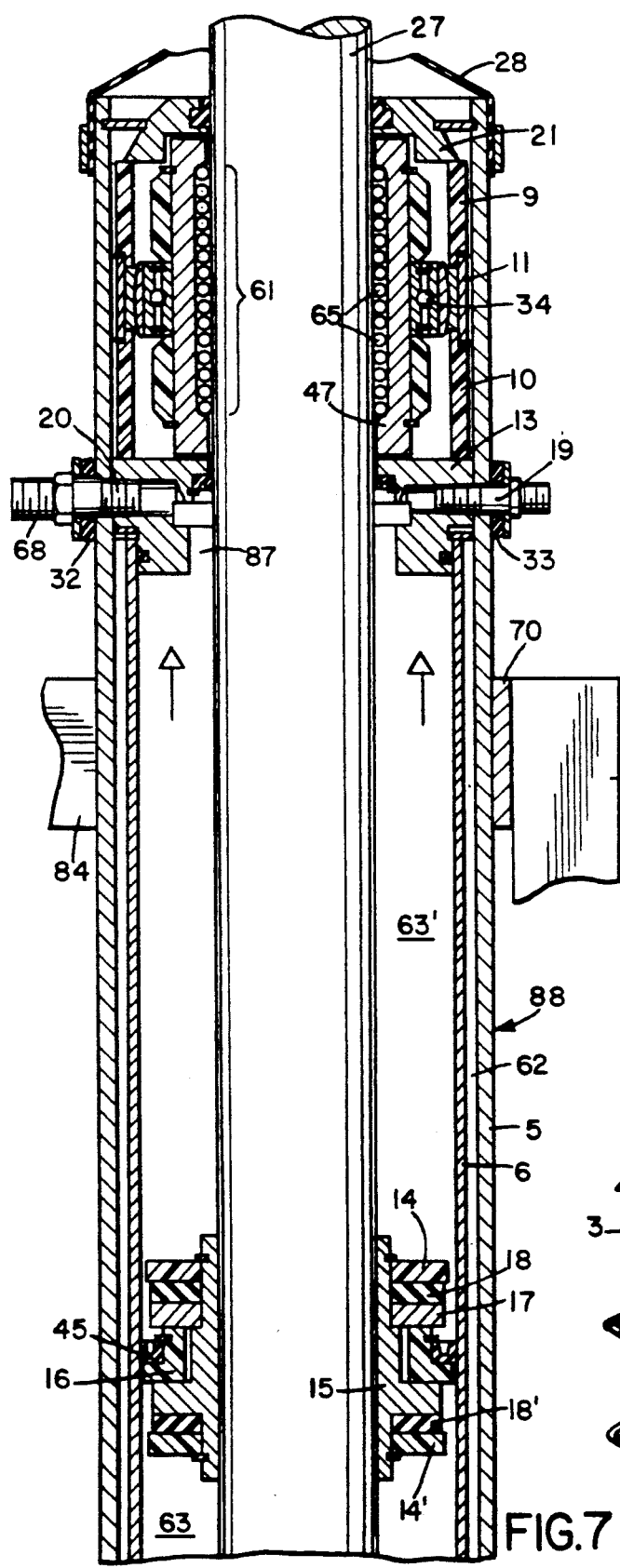
FIG. 7 is a sectional view similar to that of FIG. 4 but showing the lifting unit in a raised position.
Figure 9:
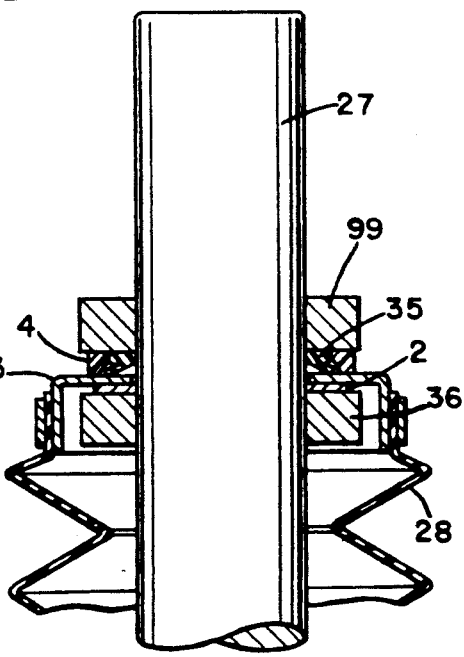
FIG. 9 is a pictorial view of a mobile embodiment of the present invention.
Figure 11:
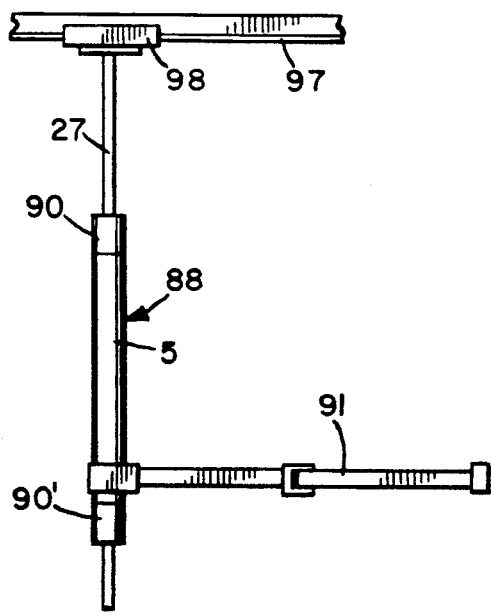
FIGS. 11 and 12 are side elevation views of two additional embodiments of the vertical lift arm apparatus of the present invention, also showing alternate methods of mounting the apparatus.
Figure 12:
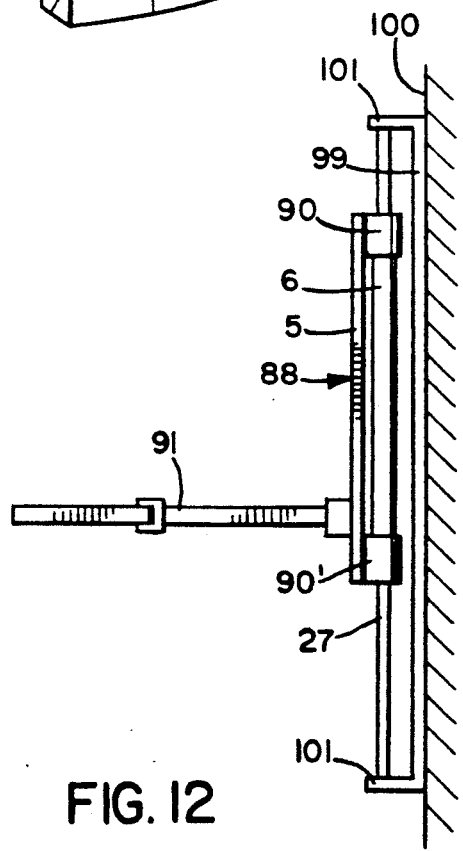

Considering first the detailed internal structure of the device, as illustrated in FIGS. 4 and 7, it will be seen that the central structure of the device is cylinder 88 which is mounted on vertical shaft 27. In these Figures vertical shaft 27 is shown as being mounted on base 1, a simple base which could be anchored to a floor or other load-bearing substrate; alternate mountings are shown in FIGS. 9, 11 and 12 and will be discussed below. The shaft 27 is maintained in position on base 1 by set screw 55 which is threaded into hole 60 formed in base 1. Shaft 27 will be of the length necessary to provide for the desired vertical lift or stroke distance. Commonly in industrial use such shafts are on the order of 6–15 feet (1.8–5.5 m) long. The diameter of the cylindrical shaft will normally be on the order of 2–4 inches (5–10 cm). Shaft 27 may be secured at its top end to a ceiling 77; alternative mountings will be described below.

Mounted in a fixed position on shaft 27 is piston 15. The location of piston 15 is extremely important, since it determines the maximum height to which the arm 91 can be raised as well as the overall length of vertical travel or stroke S of the device. Typically the vertical stroke S will be on the order of 35%–40% of the vertical height of the shaft 27.

Mounted on and encircling piston 15 are, in order from top down, upper cushion disk 14, bumper 18, seal retainer 17, lip seal 45 (which is retained in seal housing 16), lower bumper 18′, and lower cushion disk 14′. Seal housing 16 does not fit tightly against piston 15 but rather is mounted in circumferential groove 100. The inner diameter of housing 16 is slightly greater that the inner diameter of groove 100 so that a small annular region exists between the base of housing 16 and the bottom of groove 100. This permits housing 16 (and seal 45) to be formed so as to be resiliently urged outward within groove 100 as the cylinder 88 and arm 91 move and the products 76 are picked up and released, so that the sealing function of seal 45 is unaffected by the varying loads and maintains optimum sealing function during all phases of operation of the apparatus.

Mounted outside piston 15 are tube 6 and arm support structure 5. Support structure 5 is shown in FIGS. 1-9 as a full-length cylinder, but as illustrated in FIGS. 11 and 12, it could also be rectangular for most of its length (FIG. 11) or could be one or more struts or plates (FIG. 12), as long as the end portions 90 and 90′ are cylindrical to accommodate bearings 61. Support structure 5 is the longer, extending for a length equal to the stroke of the device plus the vertical height of bearings 61 and cylinder heads 13 and 13′. Tube 6 is mounted inwardly of support structure 5 and is somewhat shorter than structure 5, extending only between cylinder heads 13 and 13′.

Important to the optimum operation of this apparatus are the various materials of which the components are constructed. Most of the device, including the members 5 and 6, cylinder heads 13 and 13′ and bearings 61 will be made of metals such as carbon steel, stainless steel, aluminum and the like. Shaft 27 is preferable chrome plated steel, and maintained with high surface integrity to ensure smooth movement of the cylinder 88 along and around shaft 27. Cushioning disks 14 and 14′ are formed of a polymer with high lubricity and good strength, preferably an acetal (polyoxymethylene) polymer such as a "Delrin" polymer, to permit the cylinder 88 to rotate freely when it is its extreme raised or lowered positions and the cylinder heads 13 or 13′ are in contact with the disks 14 or 14′ respectively. Bumpers 18 and 18′ are formed of a rubber or elastomeric polymer.

Inwardly of tube 6 and bounded by tube 6, piston 15, cylinder head 13′ and shaft 27 is lower air chamber 63. Lower air chamber 63 is at its maximum volume when the cylinder 88 is lowered to its minimum elevation. As the device is pressurized, the moveable cylinder 88 will move upward carrying with it arm 91 and forming a corresponding upper air chamber 63′ between the bottom of cylinder head 13 and piston 15. The total volume of chambers 63 and 63′ will remain constant although the proportion of the volume of air in each chamber will change as the cylinder 88 rises, until chamber 63 reaches its maximum size at the top limit of cylinder 88's stroke S and the size of chamber 63 is minimized.

The vertical motion of the cylinder 88 is typically accomplished by entry of air under pressure through nipple 20 which is mounted in inlet passage 85 in cylinder head 13. Nipple 20 passes through opening 86 in outer cylinder 5 and is sealed against the surface of outer cylinder 5 by O-ring 32. A conduit such as an air hose (not shown) leads from an external source of pressurized air (not shown) and is attached with a conventional airtight coupling such as a hose clamp to outer portion 68 of nipple 20. The air under pressure is passed through conduit 85 into chamber portion 87. As the air pressure builds up in chamber 87, the cylinder 88 starts to lift vertically, opening a small segment of chamber 63′ lying above cushion disk 14. As additional air under pressure is forced into chamber 63′, the entire cylinder 88 lifts, increasing the volume of chamber 63′ as illustrated by comparison of FIGS. 4 and 7. This, of course, results in a corresponding decrease in the volume of chamber 63, as discussed above. When the cylinder 88 reaches the desired height for arm 91, the flow of additional air is halted and the pressure of the existing volume of air as sealed by seal 45 maintains the level of the arm 91.

When it is desired to lower the arm 91 and cylinder 88, the air pressure in chamber 63′ is bled off through chamber portion 87, passage 92 and nipple 19 by external valving and conduit means (not shown) attached to nipple 19. Nipple 19, as with nipple 20, is mounted through a hole 93 in outer cylinder 5 and sealed by O-ring 33.

It will be recognized that the inlet and outlet functions of nipples 19 and 20 could be reversed, or either could alone serve both functions alternately.

Air pressure compensation in chamber 63 is accomplished by allowing ambient air to enter chamber 63 through muffler/filter 30, conduit 31, nipple 20′, conduit 94 and chamber portion 95 and maintain the pressure in chamber 63 at ambient (normally atmospheric) pressure. Conduit 31 (for instance an elbow) is attached to outer portion 64 of nipple 20′. Nipple 20′ itself passes through hole 96 in outer cylinder 5 and is sealed by O-ring 32 prime. When the cylinder 88 is lowered, the buildup of pressure in chamber 63 is released by the excess air being exhausted through nipple 20′ and muffler/filter 30. Use of a filter in muffler/filter 30 prevents contaminants in the ambient air from entering chamber 63. If desired, the ambient air source may be a closed container of sufficient volume to act essentially as an atmospheric pressure source during operation of the apparatus, and the equalizing air is recycled from the container to chamber 63 and back. This is advantageous in, for instance, a clean room setting, where emission of vapors such as oil from the apparatus is to be avoided.

The rates of raising and lowering cylinder 88 and arm 91 can be whatever is desired for the purposes at hand. Commonly, however, for safety of the operator and the object 76, a maximum rate of rise of approximately 1 ft (30 cm) per second and a maximum lowering rate of 2 ft (60 cm) per second are specified. The actual rate of rise or fall can be any value below the maximum as appropriate to the size, weight and other characteristics of the object to be transported.

Critical components in the apparatus of the present invention are the self-aligning spherical bearing units generally designated 61. The bearings 61 cooperate with the end portions 90 and 90′ of the arm support structure 5 to provide unique twist-free load transfer to the shaft. Thus even for very heavy loads and greatly extended arm positions, and even though support structure 5 itself is distorted by the torque caused by the cantilevered load, the applied bearing loads are transferred from the support structure to the shaft by even line contact across the entire vertical length of the inner face 89 of each bearing 61. (It will be recognized that the applied loads will vary somewhat circumferentially around each bearing 61, since the distortion of support structure 5 by the torque of the arm 91 and object 76 will cause the upper end portion 90 and lower end portion 90' to be forced in opposite directions so that the opposite sides of the faces of the upper and lower bearings 61 will bear most strongly against shaft 27, with the other opposite sides being slightly forced away from the shaft 27. The unique and superior function of the bearings 61 in the present invention is not adversely affected, however, since the critical property is that over any vertical line on the face of either bearing 61, uniform pressure is exerted against shaft 27 for the entire length of that vertical line.)

Figure 10:
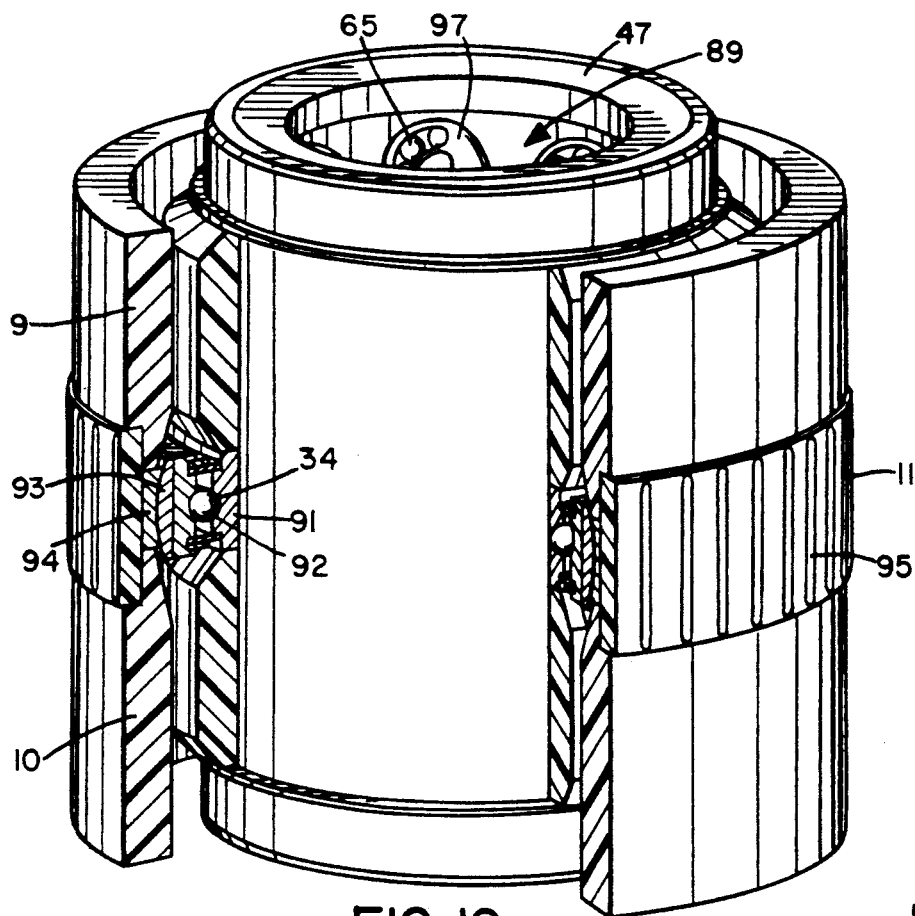
FIG. 10 is a perspective view, partially cut away, of a bearing of this invention.

The structure of a bearing 61 is illustrated in FIG. 10. Each bearing unit 61 is composed of a cylindrical linear bearing 47 having on the inner side thereof ball races 97 in which are mounted ball bearings 65. In contact with and encircling linear bearing 47 is self aligning ball bearing unit 34 which consists of a split ball race 91 in which run ball bearings 92. Outwardly of race 91 is an annular spherical mounting consisting of inner concave member 93 and outer convex member 94. The corresponding mating surfaces of members 93 and 94 are respectively convex and concave segments of the surface of a sphere. This allows for free gimbal-like movement of the bearing 61 to accommodate the twisting and distortion of the structure 5 as transmitted to the end portions 90 and 90', so that the inner face 89 of bearing 61 remains coaxial with shaft 27 at all times, and the movement of cylinder 88 along and around shaft 27 is always freely and easily accomplished, effectively independent of the torque and twist imposed by arm 91 and object 76. This also prevents transfer of twisting and distorting forces to tube 6 so that the gas-tightness of chamber 63/63' is not compromised.

Arm 91 is secured to arm support structure 5 by any appropriate means. For instance, if as shown in FIGS. 1-9, structure 5 is cylindrical, one can use split collar 70 which is joined to arm 91 by bracket 69. Split collar 70 has upper and lower extensions 84 which can be secured by clamping means, illustrated in FIG. 9 by bolts 83 which are threaded through extensions 84 and tightened in a conventional manner. If structure 5 is other than cylindrical throughout its length, as rectangular in FIG. 11 or a strut or plate in FIG. 12, and arm 91 is to be attached other than at an end 90 or 90', equivalent attaching means will be used. For instance, a square collar could be used in the device of FIG. 11 or simple mounting bolts could be used in the device of FIG. 12.

Arm 91 preferably is articulated and consists of two sections 71 and 72 joined in the middle by hinge 73. This allows the arm 91 to be extended fully or to be used in some intermediate folded position (as exemplified in FIG. 9) to allow object 76 to be placed at any desired location within the operating circle of the unit. Preferably outer portion 72 of arm 91 terminates in a fixed or swiveling connection 74 to which is attached support 75 for the object 76. There can be a number of different types of supports 75, including the support cage shown in FIG. 1; an air suction support for handling bags of material, lightweight objects, or objects which must be free of surface mars (such as television sets or other cabinet surface objects); clamping means for barrels or drums; and the like. There are a number of conventional supports 75 available in the marketplace and these are widely described in both trade and catalog literature. Those skilled in the art will immediately recognize that the nature of the support 75 and its associated operating devices (such as a vacuum line for a suction grip or a rotating clamp and motor-driven rotation unit for drums or barrels) can be interchanged at the end of arm 91 and that the particular support 75 used is not critical to this invention.

Figure 8:
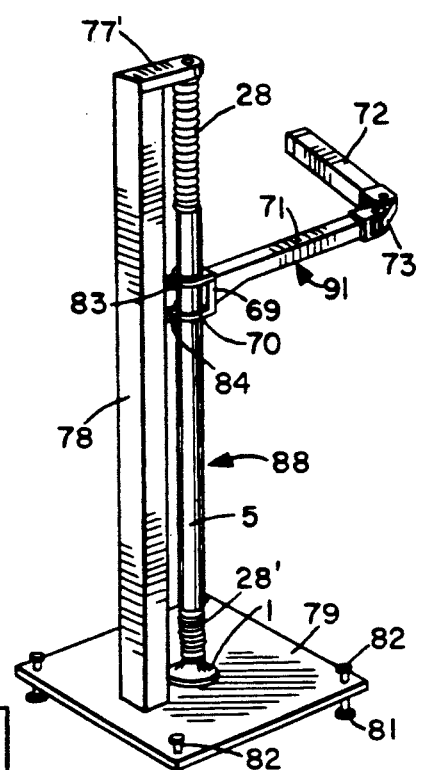
FIG. 8 is an enlarged sectional view taken on Line 8—8 of FIG. 1.

At the lower end of shaft 27 and resting on base 1 are seal support 4, bellows retainer 3 and thrust washer 2. Collar 36 seals the end of bellows 28' and seal 35 prevents leakage of air from the bellows. A similar arrangement of components is found at the top of shaft 27 to seal the end of bellows 28, as shown in FIG. 8 below retainer 99 which is fixed to shaft 27. If structure 5 is closed (for instance, cylindrical) throughout its length, air can pass along the cavity 62 between tube 6 and support 5 (by means of slots 95 in ring 11, positioned below split bearing housings 9 and 10, where necessary) between bellows 28 and 28'. This closes flow of the air prevents emissions to the environment or entrance of contaminants from the ambient environment, while keeping the bellows' air pressures constant and equal, so that vertical movement of cylinder 88 is not impeded by air resistance.

In the embodiment shown in FIG. 9, base 1 is attached to platform 79 and the top of shaft 27 is secured by shaft extension 77' of shaft 78. Platform 79 has mounted therein threaded legs 81 which permit leveling of the platform 79 by turning the tops 82 to cause legs 81 to move through threaded holes in platform 79.

Alternate mountings are shown in FIGS. 11 and 12. In FIG. 11 the apparatus is suspended downwardly from overhead track 97 and moves along track 97 by means of carriage 98. Normally there is no bottom connection for shaft 27 so that the apparatus can be moved wherever track 96 is routed. Track 96 may also be a pair of rails with a girder (not shown) therebetween, and carriage 98 may be mounted on the girder. This will permit a full range of motions of the apparatus: longitudinally along the track, laterally along the girder between the rails, rotationally around the shaft and vertically along the shaft.

FIG. 12 illustrated a simple wall mounting, where a bracket 99 is fixed to wall 100 and has extending outwardly therefrom brackets 101 into which the opposite ends of shaft 27 are mounted.

It will be evident that there are numerous embodiments of this invention which are not specifically described above, but which are clearly within the scope and spirit of the invention. Consequently the above description is to be taken as exemplary only, and the scope of the invention is to be limited solely by the appended claims.

I claim:

1. A pneumatic cylinder for support of a radially extending load and movement of said load around and along a cylindrical shaft under a driving force of gas introduced into said cylinder and acting in cooperation with an internal piston, which cylinder comprises:

a hollow extended tube having a first end and a second end and a head at each of said ends, each of said heads having a centrally located aperture therethrough for passage of said shaft;

sealing means at each end of said tube to form a gas tight annular chamber within said tube and surrounding said shaft;

arm support means extending along and connected to an outer side of said tube and being longer than said tube; said support means having first and second end portions connected to respective heads of said tube and extending axially therebeyond;

self-aligning bearing means mounted within said first and second end portions of said arm support means and positioned to be in rotationally and axially movable bearing contact with said shaft; and load transfer means between said end portions of said arm support and said self-aligning bearing means for transferring said load applied to said arm through said bearing means to said shaft without causing said bearing means to twist from a co-axial alignment with said shaft and to prevent transfer of distorting force to said tube;

whereby said cylinder is capable of traversing both axially along and radially around said shaft to cause said arm support to transfer said load from a first position to a second position.

2. A cylinder as in claim 1 further comprising conduit means in at least one of said heads for passage of gas under pressure above ambient into said annular chamber.

3. A cylinder as in claim 1 further comprising conduit means in at least one of said heads for passage of gas at ambient pressure into said annular chamber.

4. A cylinder as in claim 1 wherein said self-aligning bearing means comprises:
an annular bearing block an inner surface of which is adapted to contact said shaft;
ring bearing means on an outer side of said bearing block, an outer surface of said ring bearing means forming a convex spherical segment; and
bearing race means cooperating with said outer surface of said ring bearing means and having an inner surface forming a corresponding concave spherical segment.

5. A cylinder as in claim 4 wherein said bearing block has on said inner surface at least one ball race in which are seated rolling bearings, said rolling bearings adapted to be in rolling contact with said shaft.

6. A cylinder as in claim 5 wherein said rolling bearings are selected from the group consisting of ball bearings and roller bearings.

7. A cylinder as in claim 5 wherein said ring bearing means is positioned at a longitudinal midpoint thereof of said self-aligning bearing means.

8. Apparatus for moving a load around and along a shaft under a driving force of gas introduced into a cylinder acting in cooperation with an internal piston, comprising:
said central cylindrical shaft;
said piston fixed to said shaft at a position intermediate from ends thereof;
said cylinder surrounding said piston and a portion of said shaft, comprising:
a hollow extended tube having a first end and a second end and a head at each of said ends, each of said heads having a centrally located aperture therethrough for passage of said shaft;
first sealing means at each end of said tube to form a gas tight annular chamber within said tube and surrounding said shaft;
arm support means extending along and connected to an outer side of said tube and being longer than said tube; said support means having first and second end portions connected to respective heads of said tube and extending axially therebeyond;
self-aligning bearing means mounted within said first and second end portions of said arm support means and positioned to be in rotationally and axially movable bearing contact with said shaft; and
non-twisting load transfer means between said end portions of said arm support and said self-aligning bearing means for transferring said load applied to said arm through said bearing means to said shaft;
a gas conduit formed through one head of said inner cylinder for flow of gas under greater than ambient pressure to and from said annular chamber;
second sealing means mounted circumferentially around said piston and dividing said annular chamber into two axially disposed portions and preventing gas under pressure in one of said portions from passing below to another portion;
means for venting gas from said chamber; and
a load carrying arm connected to said arm support means;
such that the force resulting from the mass of an object suspended from said arm is transmitted to said shaft without causing said bearing means to twist from a co-axial alignment with said shaft and said cylinder is capable of traversing both axially along and radially around said shaft to cause said arm support to transfer said load from a first position to a second position.

9. Apparatus as in claim 8 further comprising low friction cushion disks attached to upper and lower sides of said piston, such that when either rotational bearing means is in contact with said piston, said rotational bearing means can rotate around said shaft while in sliding contact with a respective said disk.

10. Apparatus as in claim 9 wherein said low friction cushion disks are formed of a high lubricity polymeric material.

11. Apparatus as in claim 10 wherein said polymeric material is an acetal polymer.

12. Apparatus as in claim 8 further comprising means for supplying air at ambient pressure to and exhausting air at greater than ambient pressure from said lower portion of said chamber.

13. Apparatus as in claim 8 wherein said arm is articulated.

14. Apparatus as in claim 8 wherein said self-aligning bearing means comprises:
an annular bearing block an inner surface of which is adapted to contact said shaft;
ring bearing means on an outer side of said bearing block, an outer surface of said ring bearing means forming a convex spherical segment; and
bearing race means cooperating with said outer surface of said ring bearing means and having an inner surface forming a corresponding concave spherical segment.

15. Apparatus as in claim 14 wherein said bearing block has on said inner surface at least one ball race in which are seated rolling bearings, said rolling bearings adapted to be in rolling contact with said shaft.

16. Apparatus as in claim 15 wherein said rolling bearings are selected from the group consisting of ball bearings and roller bearings.

17. Apparatus as in claim 15 wherein said ring bearing means is positioned at a longitudinal midpoint thereof of said self-aligning bearing means.

18. Apparatus as in claim 8 further comprising means for securing said shaft in a vertical orientation.

19. Apparatus as in claim 18 wherein said shaft is secured at a lower end to a base.

20. Apparatus as in claim 19 wherein said shaft is moveably suspended from an overhead track.

21. Apparatus as in claim 19 wherein said shaft is secured to a wall.

22. In a pneumatic cylinder for support of a radially extending load and movement of said load around and along a cylindrical shaft under a driving force of gas introduced into a cylinder acting in cooperation with an internal piston, comprising a hollow extended tube having a first end and a second end and a head at each of said ends, each of said heads having a centrally located aperture therethrough for passage of said shaft; sealing means at each end of said tube to form a gas tight annular chamber within said tube and surrounding said shaft; and arm support means extending along and connected to an outer side of said tube and being longer than said tube; said support means having first and second end portions connected to respective heads of said tube and extending axially therebeyond; the improvement which comprises:
- self-aligning bearing means mounted within said first and second end portions of said arm support means and positioned to be in rotationally and axially movable bearing contact with said shaft; and
- load transfer means between said end portions of said arm support and said self-aligning bearing means for transferring said load applied to said arm through said bearing means to said shaft without causing said bearing means to twist from a co-axial alignment with said shaft and to prevent transfer of distorting force to said tube;
- whereby said cylinder is capable of traversing both axially along and radially around said shaft to cause said arm support to transfer said load from a first position to a second position.

23. The improvement as in claim 22 wherein said self-aligning bearing means comprises:
- an annular bearing block an inner surface of which is adapted to contact said shaft;
- ring bearing means on an outer side of said bearing block, an outer surface of said ring bearing means forming a convex spherical segment; and
- bearing race means cooperating with said outer surface of said ring bearing means and having an inner surface forming a corresponding concave spherical segment.

24. The improvement as in claim 23 wherein said bearing block has on said inner surface at least one ball race in which are seated-rolling bearings, said rolling bearings adapted to be in rolling contact with said shaft.

25. The improvement as in claim 24 wherein said rolling bearings are selected from the group consisting of ball bearings and roller bearings.

26. The improvement as in claim 24 wherein said ring bearing means is positioned at a longitudinal midpoint thereof of said self-aligning bearing means.

27. In an apparatus for moving a load around and along a shaft under a driving force of gas introduced into a cylinder acting in cooperation with an internal piston, comprising a central cylindrical shaft; a piston fixed to said shaft at a position intermediate from the ends of thereof; a cylinder surrounding said piston and a portion of said shaft, said cylinder comprising a hollow extended tube having a first end and a second end and a head at each of said ends, each of said heads having a centrally located aperture therethrough for passage of said shaft, first sealing means at each end of said tube to form a gas tight annular chamber within said tube and surrounding said shaft; and arm support means extending along and connected to an outer side of said tube and being longer than said tube; said support means having first and second end portions connected to respective heads of said tube and extending axially therebeyond; a gas conduit formed through one head of said inner cylinder for gas flow from an external source into said annular chamber; second sealing means mounted circumferentially around said piston and dividing said annular chamber into two axially disposed portions and preventing gas under pressure in one of said portions from passing below to the other portion; means for venting gas from said chamber; and a load carrying arm connected to said arm support means: the improvement which comprises:
- self-aligning bearing means mounted within said first and second end portions of said arm support means and positioned to be in rotationally and axially movable bearing contact with said shaft; and
- non-twisting load transfer means between said end portions of said arm support and said self-aligning bearing means for transferring said load applied to said arm through said bearing means to said shaft;
- such that the force resulting from the mass of an object suspended from said arm is transmitted to said shaft without causing said bearing means to twist from a co-axial alignment with said shaft.

28. The improvement as in claim 27 further comprising low friction cushion disks attached to upper and lower sides of said piston, such that when either rotational bearing means is in contact with said piston, said rotational bearing means can rotate around said shaft while in sliding contact with a respective said disk.

29. The improvement as in claim 28 wherein said low friction cushion disks are formed of a high lubricity polymeric material.

30. The improvement as in claim 29 wherein said polymeric material is an acetal polymer.

31. The improvement as in claim 27 further comprising means for supplying air at ambient pressure to and exhausting air at greater than ambient pressure from a lower portion of said chamber.

32. The improvement as in claim 27 wherein said arm is articulated.

33. The improvement as in claim 27 wherein said self-aligning bearing means comprises:
- an annular bearing block an inner surface of which is adapted to contact said shaft;
- ring bearing means on an outer side of said bearing block, an outer surface of said ring bearing means forming a convex spherical segment; and
- bearing race means cooperating with said outer surface of said ring bearing means and having an inner surface forming a corresponding concave spherical segment.

34. The improvement as in claim 33 wherein said bearing block has on said inner surface at least one ball race in which are seated rolling bearings, said rolling bearings adapted to be in rolling contact with said shaft.

35. The improvement as in claim 34 wherein said rolling bearings are selected from the group consisting of ball bearings and roller bearings.

36. The improvement as in claim 33 wherein said ring bearing means is positioned at a longitudinal midpoint thereof of said self-aligning bearing means.

37. The improvement as in claim 27 further comprising means for securing said shaft in a vertical orientation.

38. The improvement as in claim 37 wherein said shaft is secured at a lower end to a base.

39. The improvement as in claim 37 wherein said shaft is moveably suspended from an overhead track.

40. The improvement as in claim 37 wherein said shaft is secured to a wall.

41. A cylinder as in claim 1 wherein said shaft is vertical.

42. Apparatus as in claim 8 wherein said shaft is vertical.

43. The improvement as in claim 22 wherein said shaft is vertical.

44. The improvement as in claim 27 wherein said shaft is vertical.

* * * * *